W. W. BIRNSTOCK.
FERTILIZER DISTRIBUTER.
APPLICATION FILED JULY 10, 1915.
1,155,204.
Patented Sept. 28, 1915.
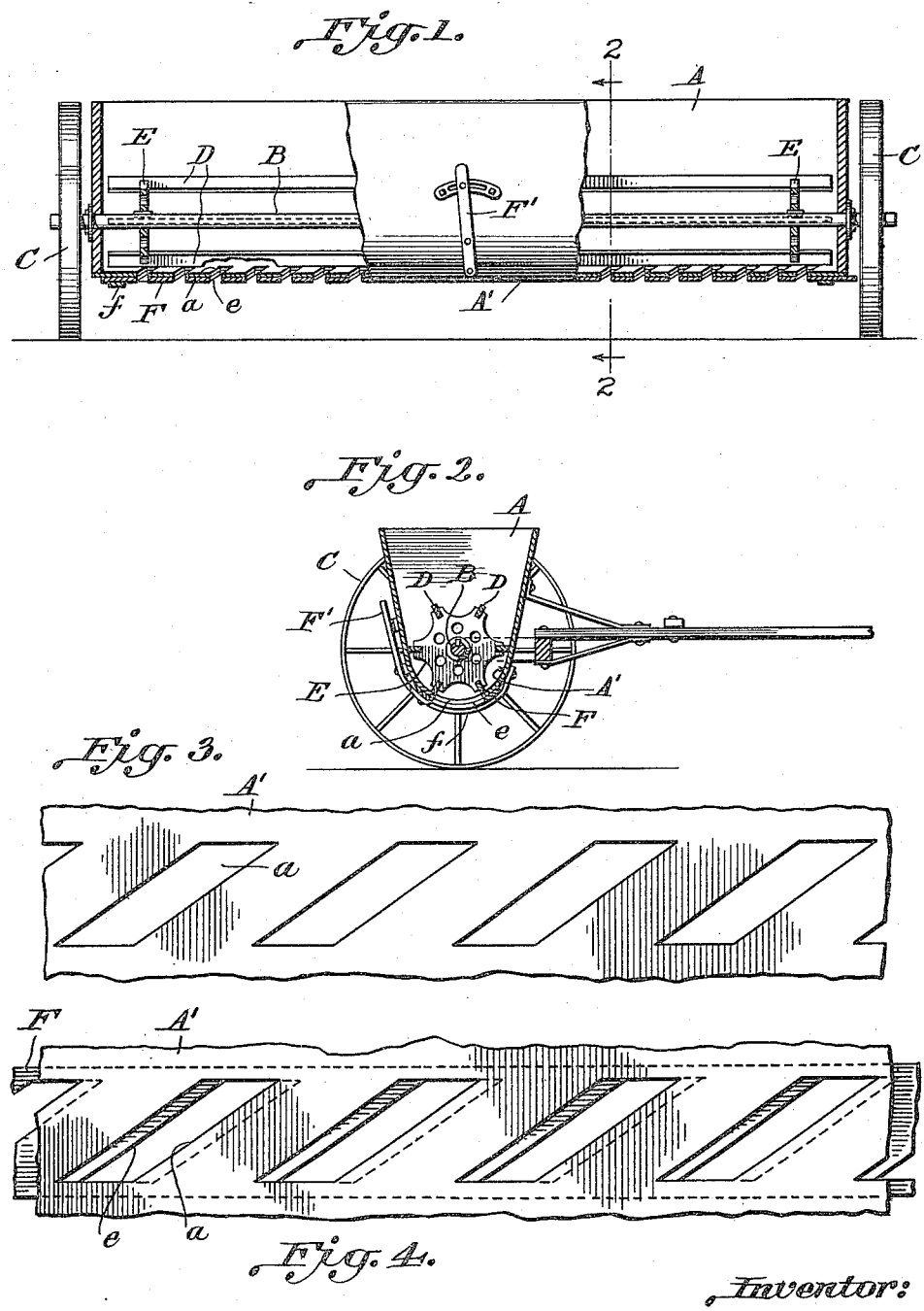
Inventor:
William W. Birnstock.
by
Atty.

# UNITED STATES PATENT OFFICE.

WILLIAM W. BIRNSTOCK, OF YORK, PENNSYLVANIA, ASSIGNOR TO HENCH & DROMGOLD COMPANY, OF YORK, PENNSYLVANIA.

FERTILIZER-DISTRIBUTER.

1,155,204.

Specification of Letters Patent. Patented Sept. 28, 1915.

Application filed July 10, 1915. Serial No. 39,039.

*To all whom it may concern:*

Be it known that I, WILLIAM W. BIRNSTOCK, of the city of York, in the county of York and State of Pennsylvania, have invented certain new and useful Improvements in Fertilizer-Distributers, of which the following is a specification.

The machine in which these improvements are embodied, while adapted for service generally as a fertilizer distributer, has been designed more particularly with reference to its use as a lime spreader.

The object of the invention is to obtain a simple, effective and inexpensive machine wherein the feed is essentially a force feed, the parts of which are so constructed and arranged that the lime or fertilizer shall be delivered in uniform flow and in a continuous even unbroken sheet, whatever may be the adjustment of the feed openings, and the consequent variation in the rate of feed.

I shall first describe, in connection with the accompanying drawings, so much of a machine embodying the improvements as requisite to an understanding of the invention, and will then point out in the claim those features which I believe to be new and of my own invention.

In the drawings, Figure 1 is a vertical transverse section in the axial plane of the axle, which in this instance is the driving shaft on which the agitator is mounted, a portion of the back of the hopper being in elevation. Fig. 2 is a cross section on line 2—2, Fig. 1. Fig. 3 is a developed plan on enlarged scale of a portion of the bottom, showing the feed openings. Fig. 4 is a like plan of a portion of the bottom and the sliding gate associated therewith, showing the feed openings partly open, and illustrating how this is effected without varying the length of said openings.

In this machine, A is the hopper, mounted on and carried by the axle B, which is secured to and revolves with the wheels C, and constitutes the driving shaft for the agitator, extending for this purpose through the hopper from end to end, and having mounted on it the agitator consisting of bars D, preferably heavy steel bars, extending lengthwise, and practically the entire length, of the hopper, evenly spaced from and parallel with one another, and attached to and firmly supported by suitable spiders E secured tightly on the driving shaft B. The bottom of the hopper is curved transversely of its length, as indicated at A', in the arc of a circle of which the driving shaft B is the axis. And the agitator bars D, as they revolve, sweep over this curved bottom in a path concentric thereto and in close proximity therewith.

In the curved bottom A' are formed discharge openings *a*. These openings are rhomboidal in shape, parallel with and evenly spaced from one another, and set with their longer axes oblique to the axis of the agitator—the angle of obliquity to such axis being preferably 35 degrees or thereabout. These parallel, evenly spaced, oblique rhomboidal openings are set at such distance apart that the toe, or front end, of one will be approximately in a fore and aft line with, or will even slightly overhang, the heel, or rear end, of the next adjoining opening, in order to assist in delivering the material in an unbroken sheet.

A gate F of curved contour to match the hopper bottom A', and having rhomboidal openings *e*, similar in size, shape and inclination to the openings *a*, and registering therewith, is mounted in suitable bearings *f* on the exterior of the bottom A' in which it can slide lengthwise of the hopper, to vary the dimensions of the feed openings. A latched operating lever F' of any suitable kind is used to effect this adjustment of the gate and to lock it in its adjusted position. It will be noted that this adjustment affects only the width of the feed opening, its length remaining always and invariably the same whatever may be the variation in its width, so long as it is open at all.

The heavy steel agitator bars D which sweep over and in close proximity to the bottom A', and from end to end of the openings *a* therein, exercise in connection with the inclined longer edges of these openings a shearing action which reduces and crumbles the lumpy portions of the material in the hopper into proper comminuted condition and insures a positive feed through each opening from end to end thereof. The distance between the agitator bars D does not materially exceed the distance in a right line traveled by a bar traversing the entire length of an inclined opening *a*, so that by the time the bar in advance is about to pass beyond the openings, the bar next in rear has reached the openings; and, as hereinbefore pointed out, inasmuch as the length of the feed openings never varies, whatever may be their width, there is a continuous force feed action on the part of the bars, which insures at all times the delivery of the lime or other fertilizer in volume which will vary with the variation in width of the feed openings, but always in the form of a continuous, even, unbroken sheet from end to end of the hopper.

The scattering board usually employed in machines of this kind, may be employed here also if desired. I do not represent it however in the drawings, as it forms no part of my invention.

I am aware that it is not new, broadly considered, to provide the hopper of a fertilizer distributer with oblong feed openings in its bottom, the longer axes of which are oblique to the axis of rotation of the agitator shaft, and this I do not claim; but in all such instances of which I have knowledge the bottom in which these openings are made is flat, so that the path in which the agitator moves is merely tangential to the bottom and the openings therein; and the openings themselves are so formed and combined with the sliding gate for regulating their size, that the length of the feed opening varies directly with its width—both of which features are fatal to the continuous force feed delivery in unbroken even sheet form, notwithstanding variation in the volume delivered, which is the end aimed at and attained by my improvement.

I do not confine myself strictly to the structural details hereinbefore shown and described in illustration of my invention; for manifestly they can be varied in some particulars without departure from the invention, but

What I claim and desire to secure by Letters Patent is—

In a fertilizer distributer, a hopper extending crosswise of a machine and having a bottom curved transversely of its length; an agitator, extending lengthwise of the hopper and mounted therein to revolve upon an axis coincident with the axis from which the curve of the hopper bottom is struck, and having evenly spaced longitudinal peripheral members which sweep over the curved hopper bottom in a path in close proximity thereto and concentric therewith; rhomboidal feed openings in the curved hopper bottom with their longer axes oblique to the axis of revolution of the agitator, parallel with and evenly spaced from one another, and of such length that by the time one of the longitudinal peripheral agitator members, in its sweeping movement over the curved hopper bottom, has passed beyond the feed openings therein, the following member will have reached said feed openings; and a sliding gate curved to match said curved hopper bottom and formed with corresponding obliquely set rhomboidal openings registering with, and operating to vary the width without changing the length of, said feed openings.

In testimony whereof I affix my signature.

WILLIAM W. BIRNSTOCK.

Copies of this patent may be obtained for five cents each, by addressing the "Commissioner of Patents. Washington, D. C."